United States Patent Office 3,258,442
Patented June 28, 1966

3,258,442
PREPARATION OF AN AQUEOUS POLYVINYL ALCOHOL COMPOSITION
Harold King Sinclair, Wilmington, Del., assignor to E. I. du Pont de Nemours and Company, Wilmington, Del., a corporation of Delaware
No Drawing. Filed May 27, 1964, Ser. No. 370,719
3 Claims. (Cl. 260—29.6)

This invention relates to gelling agents for aqueous polyvinyl alcohol solutions, and more particularly to methods for the controlled gelation of aqueous polyvinyl alcohol solutions.

This application is a continuation-in-part of my copending application Serial No. 354,154, filed March 23, 1964, now abandoned.

Many methods for gelling aqueous polyvinyl alcohol solutions are known in the art. Many of these prior art gelling agents generally act instantaneously. That is, these compounds crosslink polyvinyl alcohol immediately upon contact therewith. Such prior art gelling agents are satisfactory where such instantaneous reaction can be tolerated, for example, in the application of such a gelling agent to the surface of a preformed polyvinyl alcohol film.

However, in many instances it is desired to first mix the gelling agent with the aqueous polyvinyl alcohol solution, then subject the solution to further treatment, and thereafter affect the gelation. For example, recently polyvinyl alcohol has been shown to be very useful in the preparation of very light weight foams suitable as insulating, acoustical, and packaging materials. In the preparation of such foams, it is necessary to first prepare an aqueous polyvinyl alcohol solution, to which is added a gelling agent which does not cause instantaneous gelation. Next, the foam is generated from the solution, which is then flowed through a hose or pipe to the position or place of application, whereafter it is essential that the polyvinyl alcohol foam immediately gel.

It will be recognized that the gelling agent must not cause any substantial gelation during the preparation of the polyvinyl alcohol solution or during the generation of foam. However, gelation must occur within seconds or at the most a few minutes after the foam is placed in final position. This is essential for at least one of four reasons: (1) to assure stability of foam structure regardless of how slowly drying occurs, which may require several days or even weeks; (2) to prevent drainage of substantial quantities of liquid to lower levels; (3) to prevent soaking of the foam liquid into porous building materials such as plasterboard, wallboard, electrical wiring, insulation, etc. and/or (4) to permit the foam to be placed in a vertical or largely unconfined position without running or falling out. A rapid change in the foam from a substantially liquid state to a gelled state is particularly essential for the last-mentioned characteristic. If the change from liquid to gel is not fast, the foam will not only adversely soak such porous materials, but also may break down in part and lose proper bonding of the foam to the building walls. However, as stated above, the gelling should not be completed until after the foam has been generated and flowed or placed in position because a foam in the fully gelled state is not readily flowed through pipes, hoses, orifices, nozzles, etc. without damage to the cellular structure. In contrast, a foam in which the liquid phase has not been gelled is readily hosed, piped, spread and flowed into position.

Consequently, the prior art gelling agents which cause instantaneous gelation cannot be used in such a method for foam preparation. Instead, it is necessary to use a method for controlled gelation. That is, a method whereby a gelling agent is added to an aqueous polyvinyl alcohol solution which does not cause instantaneous gelation but which causes rapid gelation after a desired time interval.

Other uses of aqueous polyvinyl alcohol solutions also require such controlled gelation methods. For example, in the application of coating compositions comprising aqueous polyvinyl alcohol solutions onto porous substrates such as paper or paperboard, it is desired to have a gelling agent incorporated into such composition which does not instantaneously gel the composition so that it may be conveniently applied onto the substrate but which will cause rapid gelation shortly thereafter to prevent the composition from soaking into the substrate.

An object of this invention is to provide an improved method for the gelation of aqueous polyvinyl alcohol solutions. Another object is to provide an improved method for the controlled gelation of aqueous polyvinyl alcohol solutions whereby a gelling agent precursor is added to said solution which does not cause instantaneous gelation, but which upon convenient treatment causes rapid gelation after a desired time interval.

These and other objects are fully attained by the present invention which provides the process of gelling an aqueous polyvinyl alcohol solution comprising contacting in said solution at a pH of less than 5, (1) a solution-soluble starting titanium compound wherein the valence state of the titanium is +3, and (2) a solution-soluble oxidizing reagent which converts said starting titanium compound into a gelation compound which supplies titanium ions having a valence state of +4 which crosslinks the polyvinyl alcohol, said oxidizing reagent being inert in said solution in the absence of said starting chromium compound. The oxidizing reagent should convert the starting compound into the gelation compound at a rate sufficiently slow that the starting titanium compound and the redox reagent can be uniformly distributed through the solution before the onset of gelation, preferably within 5 to 500 seconds after the starting titanium compound and oxidizing reagent have been contacted in the solution.

The term "polyvinyl alcohol" refers to the water-soluble products obtained by the complete or partial alcoholysis or hydrolysis of polyvinyl esters such as polyvinyl acetate. Complete alcoholysis or hydrolysis indicates that 99–100% of the ester groups of the polyvinyl ester have been replaced by hydroxyl groups. Partial alcoholysis or hydrolysis indicates that 50–99% of the ester groups have been replaced by hydroxyl groups. A preferred polyvinyl alcohol is the commercially available, high molecular weight, fully hydrolyzed grade, having a 4% aqueous solution viscosity of 55–65 centipoises.

Titanium compounds wherein the titanium has the valence state of +4 ($Ti^{IV}$) have been used heretofore to crosslink polyvinyl alcohol. However, such $Ti^{IV}$ compounds cause instantaneous gelation of aqueous polyvinyl alcohol solutions. Moreover, the prior art provides no teaching of the use of any titanium compound to obtain the desired time controlled gelation of aqueous polyvinyl alcohol solutions as explained above. It has now been discovered that surprisingly when titanium ions having the valence state of +3 ($Ti^{III}$), in an aqueous polyvinyl alcohol solution having a pH of less than 5, are oxidized to $Ti^{IV}$ ions, the newly formed $Ti^{IV}$ ions cause rapid crosslinking of the polyvinyl alcohol, and provide the desired controlled gelation.

In the practice of this invention, a starting compound, wherein the titanium is in the valence state of +3 (herein referred to as the "starting titanium compound"), is mixed into the aqueous solution of polyvinyl alcohol which is to be gelled. It is critical that the pH of this solution be less than about 5. At a higher pH, the $Ti^{III}$ ions tend to air-oxidize to $Ti^{IV}$ ions which results in uncontrolled, premature gelation. Moreover, at a basic pH, $Ti^{III}$ ions crosslink polyvinyl alcohol, thus causing virtual instantaneous gelation upon contact with the aqueous polyvinyl alcohol solution. To insure intimate contact of this starting titanium compound throughout the polyvinyl alcohol solution, it is necessary for this compound to be solution-soluble at least to the extent necessary to effect the subsequent gelation as explained below. That is, this starting titanium compound must be soluble in the particular aqueous polyvinyl alcohol solution which is to be gelled, which usually contains an acid or acid salt to obtain the critical pH, and which may also contain other ingredients. The terms "solution-soluble" and "soluble" as used herein in accordance with standard art-recognized terminology, refer to both true solutions and colloidal solutions, since the essential requirement is intimate contact throughout the polyvinyl alcohol solution, which may be accomplished by either a true solution or a colloidal solution.

A solution-soluble oxidizing reagent is mixed into the aqueous polyvinyl alcohol solution, which converts the aforedescribed starting titanium compound, by a redox reaction, into a gelation compound which supplies $Ti^{IV}$ ions which in turn effects crosslinking of the polyvinyl alcohol. In most instances it is desired to select an oxidizing reagent which reacts relatively slow with the starting titanium compound to thereby permit the starting titanium compound and oxidizing reagent to be uniformly distributed through the solution before the onset of gelation. Selection of an appropriate oxidizing reagent is within the ordinary skill of practitioners of the art, and is simply a matter of choosing an oxidizing reagent of such known reactivity as will permit sufficient time for handling the fluid aqueous polyvinyl alcohol solution, as is required in any particular application, after the starting titanium compound and oxidizing reagent are contacted in the solution, but which will crosslink the polyvinyl alcohol to cause gelation within whatever time is desired.

Either the starting titanium compound or the oxidizing reagent may be added to the polyvinyl alcohol solution first, or the two may be added simultaneously, as may be desired.

The newly formed $Ti^{IV}$ ions effect virtually instantaneous crosslinking of polyvinyl alcohol upon contact therewith. Therefore, as the oxidizing reagent begins to react with the starting titanium compound, the gelation proceeds very rapidly, resulting in firm polyvinyl alcohol gels shortly after the onset of gelation, even though the redox reaction is not completed. Consequently, this invention provides practitioners of the art with a surprisingly new technique for gelation of aqueous polyvinyl alcohol solutions which permits the gelation agents to be mixed into a polyvinyl alcohol solution which then remains completely fluid for sufficient time to permit flowing, spraying, doctoring, or otherwise applying the solution onto a surface, or generation of a foam which can then be flowed or otherwise placed into position, but which then is very rapidly converted into a firm gelled structure.

$Ti^{III}$ compounds such as titanous sulfate, the titanium trihalides, a particular titanium trichloride, and the like, may be used as the starting titanium compound to be contacted with a suitable oxidizing reagent such as oxygen, nitric acid, the alkali metal nitrates, acetoxime, sodium sulfite, sodium bisulfite, sodium thiosulfate, and the like, to generate $Ti^{IV}$ ions. Preferably, titanium trichloride ($TiCl_3$) in an acidic liquid media is used as the starting titanium compound, and a nitrate ion ($NO_3^-$) compound is used as the oxidizing reagent. Obviously, the oxidizing reagent must be essentially inert in the aqueous polyvinyl alcohol solution in the absence of the starting titanium compound. Otherwise, undesirable side-reactions may occur, and where the oxidizing reagent is added to the solution before the starting titanium compound, the $Ti^{III}$ compound most likely would not be oxidized to generate the essential $Ti^{IV}$ ions.

In the practice of this invention, the $Ti^{III}$ compound should be added to the aqueous polyvinyl alcohol solution in an amount effective to cause the subsequent gelation of the solution after conversion (oxidation) of the $Ti^{III}$ compound to the $Ti^{IV}$ compound. The precise lower limit of the concentration of the $Ti^{III}$ compound depends primarily upon the particular type of polyvinyl alcohol used, the concentration of the polyvinyl alcohol in the aqueous solution, and the strength or firmness of the ultimate gel which is desired. Generally, the $Ti^{III}$ must be used in an amount equivalent to at least about $1 \times 10^{-4}$ gram atom of titanium per gram of polyvinyl alcohol, and in most instances, it is preferred to use the $Ti^{III}$ compound in an amount equivalent to at least about $3 \times 10^{-4}$ gram atom of titanium per gram of polyvinyl alcohol. There is no actual critical upper limit on the concentration of the $Ti^{III}$ compound. It should be noted that the strength or firmness of the gel is directly proportional to the amount of $Ti^{IV}$ ions present which crosslinks the polyvinyl alcohol, and large excess amounts of the $Ti^{IV}$ ions usually cause a shrinkage of the resulting gel, which can squeeze water out of the gel. In many instances this result in immaterial, but where such a result is undesirable, the practitioner of the art may determine by routine experimentation, the operable upper concentration of the $Ti^{III}$ compound to be added to the acidic aqueous polyvinyl alcohol solution.

The amount of the oxidizing reagent to be added to the aqueous polyvinyl alcohol solution depends upon the concentration of the $Ti^{III}$ compound used. In view of the many variables affecting the selection of the concentration of the $Ti^{III}$ compound to be used in the solution, it is impossible to state precise limits for the amount of the oxidizing reagent to be added to the solution. However, a sufficient amount of the oxidizing reagent should be contacted with the $Ti^{III}$ compound in the aqueous polyvinyl alcohol solution to generate an amount of $Ti^{IV}$ ions which is effective to gel the solution. Those skilled in the art will recognize that this amount of oxidizing reagent may be determined by routine experimentation.

This invention is further illustrated by the following examples. The mixing apparatus used in these examples consisted of two hypodermic syringes mounted adjacent to a vertical rod fitted with a sliding collar, arranged so that pressure on the collar forces liquids simultaneously from the syringes, and thence into a capillary T wherein the two liquids are mixed, and thence into a test tube. One of these syringes delivered two parts (by volume) of a polyvinyl alcohol solution and the other syringe delivered one part of a solution of an agent as inidicated. The polyvinyl alcohol solution used in all examples was a 4.5 weight percent aqueous solution of a commercially available, high molecular weight, fully hydrolyzed polyvinyl alcohol, having a 4% aqueous solution viscosity of 55–65 centipoises. In these examples, percentages are expressed in terms of percent by weight.

*Example 1*

Two parts of a solution consisting of 10 ml. of polyvinyl alcohol solution and 0.2 ml. of 5% aquous potassium nitrate solution were mixed with one part of a 0.51% aqueous titanium trichloride solution (providing $3.74 \times 10^{-4}$ gram atoms of tatanium per gram of polyvinyl alcohol). This titanium trichloride solution contained sufficient hydrochloric acid to render it 0.24 normal. The fluid mixture, which had a pH of less than 3, formed a moderately firm gel in 1.2 minutes, which became very firm in about 10 minutes. The rate of gelation was accelerated in repeated examples by the addition of about 0.1 ml. of a 1% aqueous sodium molybdate solution to the polyvinyl alcohol solution.

Example 2

Two parts of a solution consisting of 10 ml. of polyvinyl alcohol solution and 0.5 ml. of 10% aqueous sodium thiosulfate were mixed with one part of the 0.51% aqueous titanium trichloride solution described in Example 1 (providing $3.85 \times 10^{-4}$ gram atoms of titanium per gram of polyvinyl alcohol). The mixture, having a pH of less than 3 and a clear pale pink color, was fluid after mixing. A firm gel was formed in about 1.5–2 minutes. After 25 minutes, the gel turned opaque and white.

I claim:

1. The process of preparing an aqueous polyvinyl alcohol composition, which remains fluid for at least a few seconds after preparation and spontaneously gels thereafter, which process comprises contacting a gellable fluid aqueous polyvinyl alcohol solution at a pH below 5 with a trivalent titanium compound dissoluble therein to provide at least about $1 \times 10^{-4}$ gram atom of trivalent titanium per gram of polyvinyl alcohol, and an oxidizing agent dissoluble therein in amount at least effective to oxidize said amount of trivalent titanium to tetravalent titanium, but ineffective alone to gel said polyvinyl alcohol solution.

2. Process of claim 1 wherein the amount of said trivalent titanium compound is such as to provide at least $3 \times 10^{-4}$ gram atom of trivalent titanium per gram of polyvinyl alcohol.

3. Process of claim 2 wherein said trivalent titanium compound is titanium trichloride and said oxidizing agent is nitric acid or a salt thereof.

References Cited by the Examiner

UNITED STATES PATENTS 2,518,193   8/1950   Signaigo ---------- 260—91.3

MURRAY TILLMAN, *Primary Examiner.*

W. J. BRIGGS, *Assistant Examiner.*